Patented Aug. 23, 1932

1,873,753

UNITED STATES PATENT OFFICE

LOUIS T. FREDERICK, OF VALPARAISO, INDIANA, ASSIGNOR, BY MESNE ASSIGNMENTS, TO CONTINENTAL DIAMOND FIBRE COMPANY, OF NEWARK, DELAWARE, A CORPORATION OF DELAWARE

METHOD OF MAKING COMPOSITE MICA PLATES

No Drawing.    Application filed June 24, 1927.   Serial No. 201,285.

The present invention relates to the binding together of mica flakes for the production of mica sheets or plates adapted to be cut or molded into various mica articles, such as rings, commutator-segments, and various other articles having homogeneity, mechanical strength and insulating properties required of this class of materials.

Heretofore, it has been proposed to form such molded mica sheets for the production of mica articles by forming mica flakes into sheets by pasting them together with shellac, or any other suitable binder. Other suitable binders include synthetic thermo-plastic resins, such as the re-action product of glycerin and phthalic anhydride, commonly known as glyptal, and when such resins are employed, these built-up sheets are placed in an evacuated oven to approximately 110 degrees centigrade for a period varying from thirty minutes to about two hours for the purpose not only of removing the solvent but also for causing a partial curing or hardening of the binder. The partially cured sheets are then stacked and subjected to heat and pressure to form mica plates of appreciable thickness and the operation is completed by finally cutting and finishing the sheets to size, after which they are ready to be cut and to be molded under heat and pressure into various articles, such as commutator rings and segments, and binder being finally cured during this moulding step.

Glyptal and other binders of the "curable" type require expensive solvents which have to be recovered by the vacuum oven treatment and while the foregoing process possesses many advantages, it is unnecessarily costly and slow due to the relatively long preliminary heating of the sheets in the evacuated oven for the purpose of partially curing or hardening the resin, for thoroughly removing and reclaiming the solvent and for facilitating the escape of the volatile by-products. This treatment in the evacuated oven requires from thirty minutes to two hours depending upon conditions and in addition entails the further treatment of the withdrawn products to reclaim the solvent.

Among the objects of my present invention are to provide an improved process which is more economical and more expeditious and to produce a mica plate of improved homogeneity, mechanical strength, durability and insulating qualities.

Ordinary shellac is not a "curable" type of binder and although it does not possess the advantages of a curable binder, it may be dissolved in a cheap aqueous binder which need not be recovered by means of a vacuum oven. In carrying out my improved process, the amber or India mica flakes are snowed onto the suction cylinder of a continuously travelling conveyor, such as is disclosed in the patent to Waling 1,349,351, granted August 10, 1920, and the flakes pass on the conveyor beneath a binder spraying means which sprinkles the flakes with a bond of ordinary shellac dissolved in water and ammonia. The bond consists of the following formula: 30 gallons of water at sixty degrees centigrade, 5 pounds of ammonia 26 Bé. and 17¼ pounds of preferably Button shellac with a drip point of 85 degrees C. to 90 degrees C. This is mixed and after thoroughly cut, fifteen gallons of hot water are added and agitated. The binder is then allowed to cool and strained before using. After being sprayed the continuously travelling sheet is carried on the screen through a drying oven which is kept at a temperature of about 80 to 110 degrees centigrade. The continuous sheet passes through the oven in about thirty to forty-five minutes depending upon whether the plate is a one layer or a two layer plate and this is sufficient to remove all the binder solvent. Upon emerging from the drying oven the continuous sheet or plate is cut off into lengths and each individual sheet placed upon a sheet of paper and stacked.

In the foregoing part of my process, by using as an adhesive a binder made of shellac, dissolved in water and ammonia, instead of the more soluble and substantial solution such as alcohol or acetone and alcohol, I am enabled to use the continuous conveyor type of machine for continuously forming, spraying on the binder, and drying the sheet, and the fumes of the binder can be evaporated to the atmosphere, instead of having to cut the sheet into individual sheets and dry them in a vacuum oven as heretofore and reclaiming the relatively costly solvents.

After the thin sheets of mica flake have been produced and are cut into proper length as hereinbefore described, a required number of them are sprinkled with a binder of the "curable" type and are superimposed to form a mica plate of desired thickness. I prefer to cut the individual sheets in square form so that after they have been sprinkled with binder, each alternate sheet in the pile can be turned ninety degrees. This insures a more even lay or distribution of the mica flakes in the assembled stack and in a measure eliminates the necessity of hand patching now in use.

Each sheet before being stacked is sprinkled with a binder. For the binder I propose to use a suitable synthetic resin, such as glyptal dissolved in acetone and alcohol either by itself or mixed with a solution of shellac. Glyptal resin is disclosed in the patents to Callahan, 1,108,327 to 1,108,332 inclusive. The glycerol-phthalic acid reaction which results in the production of glyptal was first described by Smith in J. Soc. Chem. Ind. (London), 20, 1073 (1901). But Callahan apparently expanded Smith's basic idea and used mallic succinic, malaic and other acids in place of phthalic anhydride, obtaining a series of resins known as the alkyd resins. The alkyd resins comprise the reaction product of poly-hydric alcohol and a poly-basic acid. In my present invention I prefer to make the heat convertible resin with phthalic anhydride as the acid ingredient and glycerol as the alcohol ingredient, although I have found that other substances as for instance the glycols, diethylene glycol, triethylene glycol and other glycols and polyglycols and also the poly-hydric ether compounds may be advantageously used in place of glycerol. Since the solvent of this subsequently applied binder is more expensive I desire to dry the sheets in the vacuum oven and reclaim the solvent. To this end the stacked pile of thin sheets previously prepared are now dried in the vacuum oven at a temperature of about 90 degrees centigrade, not for the purpose of curing the glyptal, as heretofore proposed, but for the purpose merely of removing the solvent and reclaiming it. After drying, the stack of sheets is pressed in a press, rough sanded to approximate thickness and baked under pressure. They are then sanded to a finished uniform thickness, trimmed to size and are usable commercially.

In the drying process in the vacuum oven at the temperature of about 90 degrees centigrade, there is very little, if any, curing action to the shellac and the glyptal. Instead, there is a softening of the shellac under the action of the hot solvents liberated from the glyptal and a mixing of the shellac and glyptal throughout the whole mass of the built-up mica. I am led to believe, as a result of careful observation that a chemical re-action takes place between the shellac and the glyptal, which results in a more uniform binding effect, and which is prbably responsible for the improved characteristics in the mica plate of my present invention. Furthermore the alcohol and acetone of the second binder applied cuts the first applied binder and under the action of the heat the two binders are caused slightly to bubble and are blended together into a composite homogeneous binder. Because there is no curing action of the binder in this low temperature oven, I prefer to use a glyptal which in its manufacture has been carried to a harder stage in its reaction rather than attempt to cure the glyptal in the vacuum. One cannot expect to get much, if any curing of the resin in the vacuum oven, especially a resin such as glyptal because it requires a much higher temperature than can be obtained by low pressure steam.

Upon removing the dried sheets from the vacuum, they can be made into moulding plate from which articles such as V rings can be formed by merely rolling them while hot under a heavy roller, or by cooling them under hydraulic pressure between cooled pressing plates. The combination bond of shellac and glyptal works perfectly and sets up hard when baked in the finished commutator. Segment mica can be made of the combination bonded mica by merely baking the plate under pressure.

It must be apparent that as a result of the foregoing I provide a resulting material in which the mica flakes are held together by shellac which has previously been dissolved in a solution of water and ammonia and fifty per cent of glyptal binder which has previously been dissolved in alcohol and acetone, or as far as analysis is concerned, the mica flakes are held together with a mixture of fifty per cent shellac and fifty per cent glyptal which gives a most economical plate, more economical to manufacture than one wherein the binder is solely of glyptal for the reason that glyptal is not soluble in water and ammonia, a factor which at once precludes the use of the continuous conveyor belt machine and its quick drying operation because of the necessity of reclaiming the solvent.

It will be apparent that my process for the manufacture of mica plate involves the use of a shellac binder which has been previously distributed on the plate through the use of water and a volatile alkali, such as ammonia, as a solvent in combination with a binder, such as glyptal, or shellac, which has previously been distributed through the use of alcohol and acetone as a solvent but which solvent has been removed by drying in a vacuum for the purpose of removing the solvent only and not for the purpose of curing the glyptal or the shellac. It will be appreciated that instead of using glyptal as the binder for the second application as hereinbefore recited, I may use shellac in which case the solvent will preferably be alcohol, although any suitable solvent of the class may be availed of.

The combination bonded mica made as herein described has properties that neither glyptal or shellac singly can produce, especially in moulding operations. The shellac, when cut with water and ammonia has a toughness not encountered otherwise, and this toughness becomes very useful in holding the original sheets intact and causing the multiple sheets to slip one on the next instead of tearing the mica and causing it to part around sharp bends or turns instead of slipping and folding. The finished product will contain about ninety-five per cent mica flakes, about two and one half per cent glyptal and about two and one half per cent shellac when used as segments. When used for moulding purposes, it contains about ninety per cent mica flakes, about five per cent glyptal and about five per cent shellac.

Having thus described my invention, what I claim as new and desire to secure by Letters Patent is:

1. The process of making a composite mica plate which comprises applying shellac to individual flakes of mica, binding said flakes into sheets thereby, coating said sheets with a heat-convertible resin in its uncured state capable of blending with the shellac, stacking said coated sheets, and subjecting said stacked sheets to heat and pressure to cause a blending of the shellac and heat-convertible resin and to cure the blended resin whereby a strong, well-knit product is produced.

2. The process of making a composite mica plate which comprises applying shellac to individual flakes of mica, binding said flakes into sheets thereby, coating said sheets with a polyhydric alcohol-polybasic acid resin in its uncured state, stacking said coated sheets, and subjecting said stacked sheets to heat and pressure to cause a blending of the shellac and heat-convertible resin and to cure the blended resin whereby a strong, well-knit product is produced.

3. The process of making a composite mica plate which comprises applying shellac to individual flakes of mica, binding said flakes into sheets thereby, coating said sheets with glycerol-phthalicanhydride resin in its uncured state, stacking said coated sheets, and subjecting said stacked sheets to heat and pressure to cause a blending of the shellac and heat-convertible resin and to cure the blended resin whereby a strong, well-knit product is produced.

4. The process of making a composite mica plate which comprises applying shellac in aqueous solution to individual flakes of mica, binding said flakes into sheets thereby, drying said sheets to remove the shellac solvent therefrom, coating the sheets with a heat-convertible resin in an organic solvent solution in its uncured state capable of blending with the shellac, drying said stacked sheets to remove the resin solvent therefrom, stacking said coated sheets, and subjecting said stacked sheets to heat and pressure to cause a blending of the shellac and heat-convertible resin and to cure the blended resin whereby a strong, well-knit product is produced.

5. The process of making a composite mica plate which comprises applying shellac in aqueous solution to individual flakes of mica, binding said flakes into sheets thereby, drying said sheets to remove the shellac solvent therefrom, coating the sheets with a polyhydric alcohol-polybasic acid resin in its uncured state, drying said stacked sheets to remove the resin solvent therefrom, stacking said coated sheets, and subjecting said stacked sheets to heat and pressure to cause a blending of the shellac and heat-convertible resin and to cure the blended resin whereby a strong, well-knit product is produced.

6. The process of making a composite mica plate which comprises applying shellac in aqueous solution to individual flakes of mica, binding said flakes into sheets thereby, drying said sheets to remove the shellac solvent therefrom, coating the sheets with a glyptal-phthalicanhydride resin in an organic solution in its uncured state, drying said stacked sheets to remove the resin solvent therefrom, stacking said coated sheets, and subjecting said stacked sheets to heat and pressure to cause a blending of the shellac and heat-convertible resin and to cure the blended resin whereby a strong, well-knit product is produced.

In witness whereof, I have hereunto subscribed my name.

LOUIS T. FREDERICK.